Figure 1:
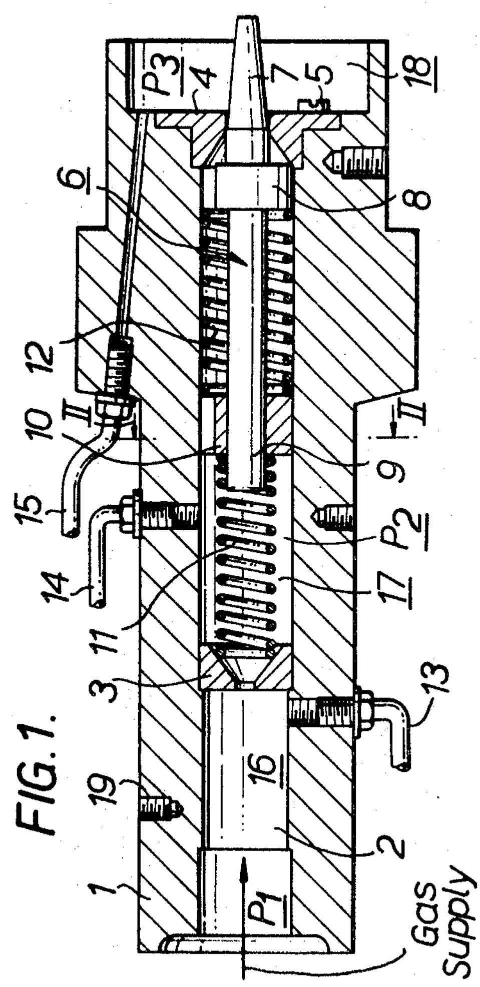

United States Patent [19]

Turner

[11] 3,750,298

[45] Aug. 7, 1973

[54] GAS GAUGES

[75] Inventor: Edward Bruce Turner, Abindgon, England

[73] Assignee: United Kingdom Atomic Energy Authority, London, England

[22] Filed: Oct. 21, 1970

[21] Appl. No.: 82,681

[30] Foreign Application Priority Data

Oct. 24, 1969 Great Britain .................. 52,358/69

[52] U.S. Cl. ............................ 33/172 R, 33/DIG. 2

[51] Int. Cl. ......................... G01b 3/22, G01b 13/02

[58] Field of Search ..................... 33/DIG. 2, 172 R, 33/169, 172 AR; 73/37.5

[56] References Cited

UNITED STATES PATENTS 3,538,609 11/1970 Minix .............................. 33/DIG. 2

*Primary Examiner*—Louis R. Prince
*Assistant Examiner*—Jon W. Henry
*Attorney*—Larson, Taylor and Hinds

[57] ABSTRACT

A gas gauge for measuring strain of a specimen comprising a conduit for constraining a flow of gas and first and second gas flow restricting orifice members located in the conduit. The second member being located on the downstream side of the first member and a tapered throttling needle adapted to contact the specimen is arranged such that axial movement of the needle regulates the flow of gas through the orifice in the second member. The gas pressures upstream of said first member and downstream of the second member are measured and changes in the pressure in the region of the conduit between the first and second members are also to provide an indication measured of the strain of the specimen.

4 Claims, 2 Drawing Figures

P3
4
7
5
18
6
8
12
10
II
II
9
15
14
P2
17
11
3
13
19
16
1
2
P1
Gas Supply 10
1
9
14
13

GAS GAUGES

This invention relates to gauges for measuring strain or creep of specimen materials and in particular although not exclusively to gauges for measuring the strain of a specimen located in the core of a materials testing reactor (hereinafter referred to as a M.T.R.)

According to the present invention there is provided a gas gauge for measuring strain of a specimen comprising a conduit for constraining a flow of gas, first and second gas flow restricting orifice members located in the conduit, the second member being located on the downstream side of the first member, a tapered throttling needle adapted to contact the specimen and arranged such that axial movement of the needle regulates the flow of gas through the orifice in the second member, means to measure the gas pressures upstream of said first member and downstream of the second member and means to measure changes in the pressure in the region of the conduit between the first and second members to provide a measure of the axial movement of the needle and hence the strain of the specimen.

Preferably the needle has a parabolic shaped profile whereby axial displacement of the needle with respect to the second orifice gives the gauge a linear response.

The needle is preferably supported in the conduit in a bush located between the first and second members, and the bush is preferably moveable axially in the conduit. The needle preferably comprises a tapered nose section which registers in the restricting orifice in the second member, a shoulder portion, and a shank portion which registers in the bush.

Biassing means may be provided to urge the needle into contact with the specimen. The biassing means may be for example springs and the biassing means may also serve to position the bush in the conduit. The biassing means may be in the form of two springs, one provided between the first member and the bush and one between the bush and the shoulder portion of the needle.

Figure 2:
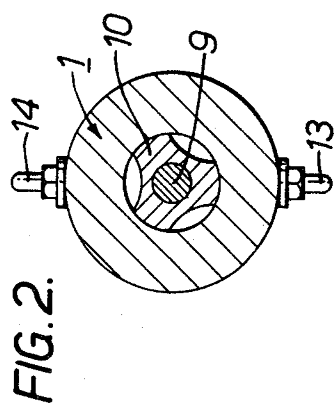

The invention will now be described by way of an example with reference to the accompanying drawings in which FIG. 1 shows one form of a gas gauge according to the present invention for measuring the strain of a specimen, and FIG. 2 shows an end view of a bush for supporting the throttling needle in the bore of the gauge of FIG. 1.

Referring to FIG. 1, the gauge comprises a stainless steel body 1 having a central bore 2 which forms a gas supply channel. The bore 2 is counter-bored to receive a fixed sharp edged control orifice member 3. The member 3 has a small diameter orifice which is counter sunk on the down stream side of the member 3. The member 3 may be rigidly mounted in the body 1 or if desired member 3 may be a loose fit in the counter bored region of bore 2 and may be held in place by the springs 11 and 12. The bore 2 is further counter-bored to receive a second fixed restricting orifice member 4, which is provided with a small diameter orifice, counter-sunk on the upstream side of the member 4. The member 4 is located rigidly in the end of the bore 2 by means of screws 5 (only one of which is shown).

A stainless steel throttling needle 6 having a tapered nose portion 7, a shoulder 8, and a tail portion 9 is supported in the bore 2 at the tail portion 9 by a bush 10 and by the shoulder 8. The bush 10 is freely moveable axially in the bore 2 and the bush 10 and shoulder portion 8 of the needle are shaped so as not to impede greatly the flow of gas through the bore 2. This latter consideration may be achieved by making the bush 10 and the shoulder 8 in the form of a body having three equi-spaced circumferential locating portions contacting the bore 2 and the circumference of the body being machined away between the locating portions as shown in FIG. 2.

A spring 11 is provided between the member 3 and the bush 10 and a second spring 12 is provided between the bush 10 and the upstream side of the shoulder 8. The springs 11 and 12 are made of nimonic 75 steel and serve to pre-load the needle in one direction and also to control the degree of movement of the steadying bush 10 to ensure that the needle is evenly supported in the bore 2 and hence is accurately positioned in the orifice in member 4.

The nose portion 7 of the needle 6 preferably has a parabolic profile in order that a substantially linear response over the operating range of movement of the needle 6. The exact shape of the profile however, is determined by the response characteristics required of the gauge.

Three pressure tappings 13, 14 and 15 are provided in the body 1 whereby the pressures respectively at locations upstream of member 3, downstream of member 3 and downstream of member 4 can be measured.

The above described gauge is particularly suited for use in an experimental rig which is inserted into the core of a M.T.R. in which case the body is supported in the rig by any suitable method, for example, the body may be bolted to the rig structure by means of bolts registering in the blind threaded holes 19.

The gauge is calibrated prior to use by displacing the needle 6 a known amount and adjusting the pressure ($P_1$) immediately upstream of the member 3 i.e. in space 16 and the pressure ($P_3$) immediately downstream of member 4 i.e. in space 18 to predetermined values. The values of pressure ($P_2$) in space 17 are plotted against axial displacement of the needle with $P_1$ and $P_3$ maintained constant to form a calibration chart which is peculiar to the gauge being calibrated and for each different environment the gauge must be re-calibrated. The gauge is preferably calibrated with the body at different known temperatures such that for a given temperature 1 and a given pressure $P_2$, the extension or compression of the specimen may be calculated.

In use after calibration, the gauge is arranged such that the nose portion 7 of the needle 6 abuts a surface of the specimen the strain of which is being measured. Extension of the specimen in a direction parallel with the longitudinal axis of the bore 2 displaces the needle 6 relative to member 4 thereby increasing the annular gap between the needle 6 and the member 4. Gas, for example air or helium (helium is suitable when the gauge is used in a nuclear reactor as helium is normally used as a purge gas) is fed to the bore 2 from a source of supply via a valved circuit in order to maintain pressure P1 substantially constant at a predetermined value, for example of the order of 0.2 atmosphere and the pressure $P_3$ is maintained substantially constant at a predetermined value, for example of the order of 0.07 atmospheres. This gives a maximum pressure difference, to be related to the specimen extension, of 0.13 atmospheres. These quantities are measured with single-leg water manometers. Axial displacement of the needle 6 regulates the flow of helium through the orifice in member 4 and the resultant changes in pressure $P_2$ are a function of the amount of extension (or compression) of the specimen. The amount of extension or compression of the specimen is obtained by comparing the values of P2 with that plotted on the calibration chart.

The needle 6 and the orifice in member 4 act as a control valve which regulates the gas flow through the gauge, and the pressure drop to be measured is that obtained across the orifice in member 3 which is of fixed geometry. Providing $P_1$ and $P_2$ are measured with respect to $P_3$ then minor variations of flow through the orifice in member 4 will not seriously affect the extrapolated values of the strain of the specimen. The pressure $P_3$ may be at the same pressure as that surrounding the specimen.

It is to be understood that during contraction of the specimen the needle is maintained in contact with the specimen by the spring 11 and because the pressure drop across a fixed orifice in member 3 is measured, the constant geometry ensures that only one variable, the flow rate is present. The resulting calibration of change of pressure $P_2$ (i.e. needle movement) is stable for a particular gauge temperature and accurately repeatable. Furthermore the operation of the gauge is not seriously affected by vibration because the damping effect of the springs 11 and 12 restrain movement of the needle 6 and the gas volume in space 17 prevents slight variations of flow at the orifice in member 4 from producing unacceptably high pressure drop fluctuations at the orifice in member 3.

The temperature of the gauge body 1 may be closely controlled during use of the gauge by means of an electrical heating element located around the gauge. When used in an experimental rig in a M.T.R. the electrical heating element is positioned around the gauge between the gauge and the heat sink of the reactor coolant. When used in a nuclear irradiation environment the additional heat applied to the gauge is adjusted to compensate for variations in nuclear heating which may occur. Measurement of the temperature of the body 1 may be effected using thermocouples and the temperature controlled by conventional control means.

The materials of construction of the gauge are chosen so as to be compatible with the environment in which the gauge is to be used such that gas flow through the gauge is not modified radically, and to ensure that the performance of the gauge will remain stable throughout its working life. The invention is not limited to the foregoing example.

I claim:

1. A gas gauge for measuring strain of a specimen comprising a conduit for constraining a flow of gas, first and second gas flow restricting orifice members located in the conduit, the second member being located on the downstream side of the first member, means for regulating the flow of gas through the orifice in the second member in response to strain movement of the specimen comprising a specimen engaging needle which is axially moveable in said conduit in response to strain movement of the specimen and which has a tapered throttling section which registers in the orifice in the second member, and means to measure the gas pressures upstream of said first member, downstream of second member, and in the region of the conduit between the first and second members.

2. A gauge according to claim 1 wherein the throttling section of the needle has a parobolic shaped profile.

3. A gauge according to claim 1 wherein a bush is movably mounted in the conduit between the first and second members to enable the bush to move axially in the conduit relative to the needle, and the needle comprises a tapered nose section which registers in the restricting orifice in the second member, a shoulder portion, and a shank portion which registers in the bush.

4. A gauge according to claim 3 wherein biassing means are provided to urge the needle into contact with the specimen, said biassing means also serving to position the bush in the conduit.

* * * * *